(12) United States Patent
Fukushi et al.

(10) Patent No.: US 11,028,456 B2
(45) Date of Patent: Jun. 8, 2021

(54) ELECTRIC RESISTANCE WELDED STEEL PIPE FOR TORSION BEAM

(71) Applicant: NIPPON STEEL & SUMITOMO METAL CORPORATION, Tokyo (JP)

(72) Inventors: Takaaki Fukushi, Tokyo (JP); Yasuhiro Shinohara, Tokyo (JP); Hideki Hamatani, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 147 days.

(21) Appl. No.: 16/327,066

(22) PCT Filed: Aug. 23, 2017

(86) PCT No.: PCT/JP2017/030205
§ 371 (c)(1),
(2) Date: Feb. 21, 2019

(87) PCT Pub. No.: WO2018/066249
PCT Pub. Date: Apr. 12, 2018

(65) Prior Publication Data
US 2019/0217424 A1 Jul. 18, 2019

(30) Foreign Application Priority Data
Oct. 3, 2016 (JP) ............................. JP2016-195680

(51) Int. Cl.
C22C 38/04 (2006.01)
C22C 38/06 (2006.01)
(Continued)

(52) U.S. Cl.
CPC .......... C21D 8/105 (2013.01); B23K 35/3073 (2013.01); C21D 9/08 (2013.01);
(Continued)

(58) Field of Classification Search
CPC .. B23K 35/3073; B23K 11/002; C21D 8/105; C21D 9/08; C21D 2211/005;
(Continued)

(56) References Cited

U.S. PATENT DOCUMENTS

2009/0277542 A1 11/2009 Nakamura et al.
2009/0277544 A1 11/2009 Toyoda et al.
2013/0056115 A1 3/2013 Fukushi et al.

FOREIGN PATENT DOCUMENTS

CN 101484602 A 7/2009
CN 104694822 A 6/2015
(Continued)

OTHER PUBLICATIONS

Extended European Search Report, dated Feb. 13, 2020, for European Application No. 17858089.0.
(Continued)

*Primary Examiner* — Anthony J Zimmer
*Assistant Examiner* — Dean Mazzola
(74) *Attorney, Agent, or Firm* — Birch, Stewart, Kolasch & Birch, LLP

(57) ABSTRACT

An electric resistance welded steel pipe for a torsion beam, in which a base metal portion includes, in terms of % by mass, 0.04 to 0.12% of C, 0.03 to 1.20% of Si, 0.30 to 2.50% of Mn, 0.08 to 0.24% of Ti, 0.005 to 0.500% of Al, 0.01 to 0.06% of Nb, and 0.0005 to 0.0100% of N, a balance including Fe and impurities, wherein $V_{c90}$, defined by the following Formulae (i) and (ii), is 200 or more, a mass ratio of Ti content to C content is from 0.85 to 5.00, an areal ratio of ferrite is 80% or more, an average crystal grain size of ferrite crystal grains is 10 μm or less, and an average aspect ratio of ferrite crystal grains is 2.0 or less, in a metallographic microstructure of a central portion in a wall thickness direction of the base metal portion;

$\log V_{c90} = 2.94 - 0.75(\beta a - 1)$      Formula (i);

$\beta a = 2.7C + 0.4Si + Mn + 0.45Ni + 0.8Cr + Mo$      Formula (ii).

8 Claims, 3 Drawing Sheets

(51) Int. Cl.
*C22C 38/00* (2006.01)
*C22C 38/12* (2006.01)
*C22C 38/14* (2006.01)
*C22C 38/20* (2006.01)
*C22C 38/28* (2006.01)
*C22C 38/26* (2006.01)
*C22C 38/08* (2006.01)
*C22C 38/02* (2006.01)
*C22C 38/58* (2006.01)
*C21D 8/10* (2006.01)
*B23K 35/30* (2006.01)
*C21D 9/08* (2006.01)
*C21D 9/46* (2006.01)
*B23K 11/00* (2006.01)

(52) U.S. Cl.
CPC .............. *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/26* (2013.01); *C22C 38/28* (2013.01); *C22C 38/58* (2013.01); *B23K 11/002* (2013.01); *C21D 2211/005* (2013.01)

(58) Field of Classification Search
CPC ..... C22C 38/00; C22C 38/001; C22C 38/002; C22C 38/005; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/38; C22C 38/40; C22C 38/42; C22C 38/44; C22C 38/46; C22C 38/48; C22C 38/50; C22C 38/58
See application file for complete search history.

(56) References Cited

FOREIGN PATENT DOCUMENTS

| | | | |
|---|---|---|---|
| EP | 2752499 | A1 | 7/2014 |
| EP | 2868765 | A1 | 5/2015 |
| EP | 3050990 | A1 | 8/2016 |
| JP | 2003-321746 | A | 11/2003 |
| JP | 2003-321747 | A | 11/2003 |
| JP | 2003-321748 | A | 11/2003 |
| JP | 2003321746 | A * | 11/2003 |
| JP | 2003321747 | A * | 11/2003 |
| JP | 2003321748 | A * | 11/2003 |
| JP | 2005-2385 | A | 1/2005 |
| JP | 2007-262487 | A | 10/2007 |
| JP | 2007-270197 | A | 10/2007 |
| JP | 2007270197 | A * | 10/2007 |
| JP | 2009-19214 | A | 1/2009 |
| JP | 2009-19265 | A | 1/2009 |
| JP | 2009-293067 | A | 12/2009 |
| JP | 2009293067 | A * | 12/2009 |
| JP | 2011-38155 | A | 2/2011 |
| JP | 2016-74004 | A | 5/2016 |
| KR | 10-2009-0016746 | A | 2/2009 |
| WO | WO 2008/018624 | A1 | 2/2008 |
| WO | WO 2009/133965 | A1 | 11/2009 |
| WO | WO 2011/145234 | A1 | 11/2011 |

OTHER PUBLICATIONS

International Search Report for PCT/JP2017/030205 dated Nov. 21, 2017.
Written Opinion of the International Searching Authority for PCT/JP2017/030205 (PCT/ISA/237) dated Nov. 21, 2017.

* cited by examiner

ELECTRIC RESISTANCE WELDED STEEL PIPE FOR TORSION BEAM

TECHNICAL FIELD

The present disclosure relates to an electric resistance welded steel pipe for a torsion beam.

BACKGROUND ART

Conventionally, studies have been made on steel materials used for automobile structural members (for example, automotive underbody parts).

For example, Patent Document 1 discloses a hot-rolled steel sheet for a mechanical structure steel pipe excellent in fatigue characteristics and bending formability, which is used for a mechanical structure steel pipe such as an automotive underbody part steel pipe.

In addition, Patent Document 2 discloses a steel material for an automotive underbody part that has high fatigue characteristics despite favorable forming processability, and is excellent in fatigue characteristics that do not require a lot of cost for heat treatment.

Further, Patent Document 3 discloses a high tensile strength steel which is suitable for automobile structural members such as a torsion beam, an axle beam, a trailing arm, and a suspension arm which are required to have high strength, excellent workability, and excellent torsional fatigue resistance.

Patent Document 1: International Publication No. WO 2009/133965
Patent Document 2: International Publication No. WO 2008/018624
Patent Document 3: Japanese Patent Application Laid-Open (JP-A) No. 2011-38155

SUMMARY OF INVENTION

Technical Problem

High tensile strength (in particular, tensile strength in the pipe axis direction) is required for a torsion beam, which is one of automotive underbody parts.

Meanwhile, a torsion beam may be produced by processing an electric resistance welded steel pipe (hereinafter also referred to as an "electric resistance welded steel pipe a for torsion beam") by bending forming. In such a case, cracks (hereinafter also referred to as "inner surface cracks") may be generated on the inner surface of the bent-formed portion of the electric resistance welded steel pipe. From the viewpoint of bending formability of an electric resistance welded steel pipe, there are cases in which it is required to improve the inner surface crack resistance of an electric resistance welded steel pipe.

The term "inner surface cracking resistance" used herein means a property capable of suppressing inner surface cracking when processing an electric resistance welded steel pipe by bending forming.

In Patent Documents 1 to 3, no examination has been made from the viewpoint of improving the inner surface cracking resistance of the steel pipe, leaving room for improvement.

An object of the disclosure is to provide an electric resistance welded steel pipe for a torsion beam having excellent tensile strength in a pipe axis direction and also excellent inner surface cracking resistance.

Solution to Problem

Means for solving the problem described above includes the following aspects.

<1> An electric resistance welded steel pipe for a torsion beam, the steel pipe comprising a base metal portion and an electric resistance welded portion, wherein a chemical composition of the base metal portion consists of, in terms of % by mass:
0.04 to 0.12% of C,
0.03 to 1.20% of Si,
0.30 to 2.50% of Mn,
0 to 0.030% of P,
0 to 0.010% of S,
0.08 to 0.24% of Ti,
0.005 to 0.500% of Al,
0.01 to 0.06% of Nb,
0.0005 to 0.0100% of N,
0 to 1.00% of Cu,
0 to 1.00% of Ni,
0 to 1.00% of Cr,
0 to 0.50% of Mo,
0 to 0.20% of V,
0 to 0.10% of W,
0 to 0.0200% of Ca,
0 to 0.0200% of Mg,
0 to 0.0200% of Zr,
0 to 0.0200% of REM, and
a balance consisting of Fe and impurities, wherein:
$V_{c90}$, defined by the following Formula (i), is 200 or more,
a mass ratio of Ti content to C content is from 0.85 to 5.00,
an areal ratio of ferrite is 80% or more, an average crystal grain size of ferrite crystal grains is 10 μm or less, and an average aspect ratio of ferrite crystal grains is 2.0 or less, in a metallographic microstructure of a central portion in a wall thickness direction of an L cross section of the base metal portion, and
a tensile strength in a pipe axis direction is from 750 to 1000 MPa;

$$\log V_{c90} = 2.94 - 0.75(\beta a - 1) \quad \text{Formula (i)}$$

$$\beta a = 2.7C + 0.4Si + Mn + 0.45Ni + 0.8Cr + Mo \quad \text{Formula (ii)}$$

wherein, in Formula (i), βa represents a value defined by Formula (ii), and in Formula (ii), element symbols represent % by mass of respective elements.

<2> The electric resistance welded steel pipe for a torsion beam according to <1>,
wherein the chemical composition of the base metal portion contains, in terms of % by mass, at least one selected from the group consisting of:
more than 0% but equal to or less than 1.00% of Cu,
more than 0% but equal to or less than 1.00% of Ni,
more than 0% but equal to or less than 1.00% of Cr,
more than 0% but equal to or less than 0.50% of Mo,
more than 0% but equal to or less than 0.20% of V,
more than 0% but equal to or less than 0.10% of W,
more than 0% but equal to or less than 0.0200% of Ca,
more than 0% but equal to or less than 0.0200% of Mg,
more than 0% but equal to or less than 0.0200% of Zr, and
more than 0% but equal to or less than 0.0200% of REM.

<3> The electric resistance welded steel pipe for a torsion beam according to <1> or <2>, which has an outer diameter of from 50 to 150 mm and a wall thickness of from 2.0 to 4.0 mm.

Advantageous Effects of Invention

According to the disclosure, a steel pipe for a torsion beam having excellent tensile strength in a pipe axis direction and also excellent inner surface cracking resistance is provided.

DESCRIPTION OF EMBODIMENTS

Figure 1:
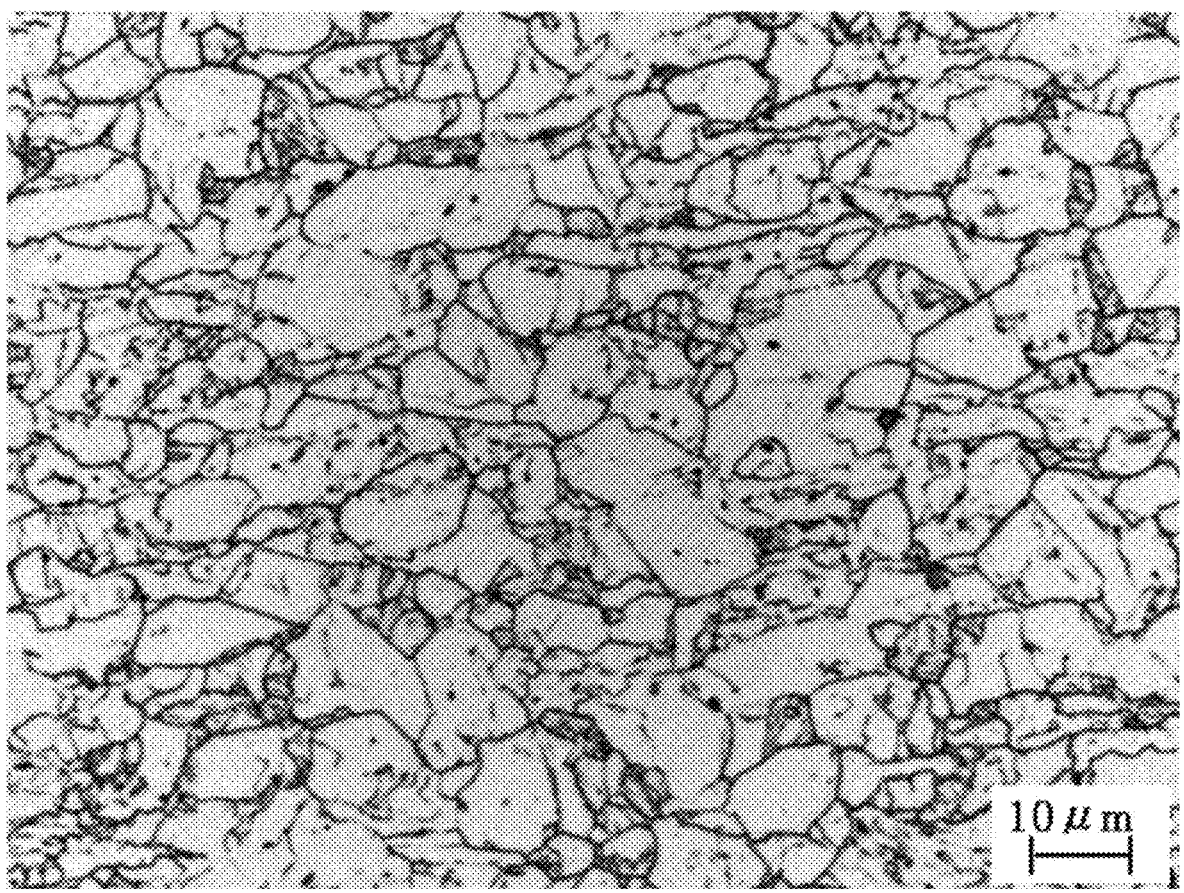
FIG. 1 is a metallographic microstructure image (optical micrograph) showing an example of the metallographic microstructure of a base metal portion of the electric resistance welded steel pipe of the disclosure.

A numerical range expressed by "x to y" herein includes the values of x and y in the range as the minimum and maximum values, respectively.

The content of a component (element) expressed by "%" herein means "% by mass".

The content of C (carbon) may be herein occasionally expressed as "C content". The content of another element may be expressed similarly.

The term "step" herein encompasses not only an independent step but also a step of which the desired object is achieved even in a case in which the step is incapable of being definitely distinguished from another step.

In the numerical ranges described herein as stepwise ranges, the upper limit value or the lower limit value of a certain stepwise numerical range may be replaced by the upper limit value or the lower limit value of a different stepwise numerical range, and may also be replaced by a value set forth in Examples.

The electric resistance welded steel pipe for a torsion beam (hereinafter also simply referred to as "electric resistance welded steel pipe") of the disclosure includes a base metal portion and an electric resistance welded portion, a chemical composition of the base metal portion consists of, in terms of % by mass: 0.04 to 0.12% of C, 0.03 to 1.20% of Si, 0.30 to 2.50% of Mn, 0 to 0.030% of P, 0 to 0.010% of S, 0.08 to 0.24% of Ti, 0.005 to 0.500% of Al, 0.01 to 0.06% of Nb, 0.0005 to 0.0100% of N, 0 to 1.00% of Cu, 0 to 1.00% of Ni, 0 to 1.00% of Cr, 0 to 0.50% of Mo, 0 to 0.20% of V, 0 to 0.10% of W, 0 to 0.0200% of Ca, 0 to 0.0200% of Mg, 0 to 0.0200% of Zr, 0 to 0.0200% of REM, and a balance consisting of Fe and impurities, $V_{c90}$, defined by the following Formula (i), is 200 or more, a mass ratio of Ti content to C content (hereinafter also referred to as "Ti/C ratio") is from 0.85 to 5.00, an areal ratio of ferrite in a metallographic microstructure of a central portion in a wall thickness direction of an L cross section of the base metal portion is 80% or more, an average crystal grain size of ferrite crystal grains is 10 μm or less, an average aspect ratio of ferrite crystal grains is 2.0 or less, and tensile strength in a pipe axis direction is from 750 to 1000 MPa.

$$\log V_{c90}=2.94-0.75(\beta a-1) \quad \text{Formula (i)}$$

$$\beta a=2.7C+0.4Si+Mn+0.45Ni+0.8Cr+Mo \quad \text{Formula (ii)}$$

In Formula (i), βa represents a value defined by Formula (ii), and in Formula (ii), element symbols represent % by mass of respective elements.

In the electric resistance welded steel pipe of the disclosure, the base metal portion refers to a portion other than the electric resistance welded portion and a heat affected zone of an electric resistance welded steel pipe.

The heat affected zone (hereinafter also referred to as "HAZ") refers to a portion affected by heat caused by electric resistance welding (affected by heat caused by the electric resistance welding and seam heat treatment in a case in which the seam heat treatment is performed after the electric resistance welding).

The electric resistance welded steel pipe of the disclosure has excellent tensile strength in a pipe axis direction (specifically, a tensile strength in a pipe axis direction of 750 MPa or more) and also excellent inner surface cracking resistance.

The reason for obtaining these effects are assumed as follows. However, the electric resistance welded steel pipe of the disclosure is not limited to the following assumed reasons.

The electric resistance welded steel pipe of the disclosure has the above-mentioned metallographic microstructure, in which the areal ratio of ferrite is 80% or more, the average crystal grain size of ferrite crystal grains is 10 μm or less, and the average aspect ratio of ferrite crystal grains is 2.0 or less such that inner surface cracking resistance is improved. The reason for the above is assumed to be as follows.

It is considered that inner surface cracks are generated when shear deformation by bending forming causes tearing of the grain boundary at the inner surface of the bent portion formed by bending forming and its vicinity and the tearing progresses. It is therefore considered that inner surface cracking that could occur as described above can be suppressed (i.e., inner surface cracking resistance is improved) by configuring the metallographic microstructure to be a metallographic microstructure having an areal ratio of ferrite of 80% or more, further refining the ferrite crystal grains (i.e., making the average crystal grain size of ferrite crystal grains to 10 μm or less), and making the shape of ferrite crystal grains closer to a spherical shape (i.e., setting the average aspect ratio of ferrite crystal grains to 2.0 or less).

A metallographic microstructure having an areal ratio of ferrite of 80% or more can be realized by, for example, setting $V_{c90}$ to 200 or more, thereby reducing the hardenability of steel.

In general, there is a tendency that as the areal ratio of ferrite constituting a soft phase increases, tensile strength in a pipe axis direction decreases. In this regard, according to the electric resistance welded steel pipe of the disclosure, high tensile strength at a level of 750 MPa is realized by, for example, setting the Ti/C ratio to 0.85 or more to cause precipitation of TiC, thereby improving the strength of steel.

The chemical composition and metallographic microstructure of the electric resistance welded steel pipe of the disclosure are described below.

<Chemical Composition of Base Metal Portion>

The chemical composition (hereinafter also referred to as "chemical composition in the disclosure") of the base metal portion of the electric resistance welded steel pipe of the disclosure is described below.

C: 0.04 to 0.12%

C is an element for improving the strength of steel. In a case in which the C content is less than 0.04%, the strength required for a steel pipe for a torsion beam might not be achieved. Accordingly, the C content is 0.04% or more. The C content is preferably 0.05% or more, and more preferably 0.06% or more.

Meanwhile, in a case in which the C content exceeds 0.12%, the strength might be excessively increased, resulting in deterioration of inner surface cracking resistance. Accordingly, the C content is 0.12% or less. The C content is preferably 0.10% or less.

Si: 0.03 to 1.20%

Si is an element used for deoxidation. In a case in which the Si content is less than 0.03%, deoxidation might become insufficient, resulting in generation of a coarse oxide. Accordingly, the Si content is 0.03% or more. The Si content is preferably 0.10% or more, and more preferably 0.20% or more.

Meanwhile, in a case in which the Si content exceeds 1.20%, it might cause generation of an inclusion such as $SiO_2$, thereby facilitating generation of microvoids during forming. Accordingly, the Si content is 1.20% or less.

The Si content is preferably 1.00% or less, more preferably 0.50% or less, still more preferably 0.40%, and furthermore preferably 0.30% or less.

Mn: 0.30 to 2.50%

Mn is an element that improves the strength of steel. In a case in which the Mn content is less than 0.30%, the strength required for a steel pipe for a torsion beam might not be achieved. Accordingly, the Mn content is 0.30% or more. The Mn content is preferably 0.50% or more, and more preferably 0.60% or more.

Meanwhile, in a case in which the Mn content exceeds 2.50%, the strength might be excessively increased, resulting in deterioration of inner surface cracking resistance. Accordingly, the Mn content is 2.50% or less. The Mn content is preferably 2.00% or less, and more preferably 1.60% or less.

P: 0 to 0.030%

P is an impurity. In a case in which the P content exceeds 0.030%, it might facilitate concentration of P in the crystal grain boundary, resulting in deterioration of inner surface cracking resistance. Accordingly, the P content is 0.030% or less. The P content is preferably 0.020% or less.

Meanwhile, the P content may be 0%. From the viewpoint of reducing a dephosphorization cost, the P content may be more than 0%, 0.001% or more, or 0.010% or more.

S: 0 to 0.010%

S is an impurity. In a case in which the S content exceeds 0.010%, it might cause generation of coarse MnS, resulting in deterioration of inner surface cracking resistance. Accordingly, the S content is 0.010% or less. The S content is preferably 0.005% or less.

Meanwhile, the S content may be 0%. From the viewpoint of reducing a desulfurization cost, the S content may be more than 0%, or 0.001% or more.

Ti: 0.08 to 0.24%

Ti is an element that improves the strength of steel by precipitating as TiC and that contributes to crystal grain size refining through the pinning effect in hot rolling. In a case in which the Ti content is less than 0.08%, the strength required for a steel pipe for a torsion beam and the pinning effect of crystal grains might not be achieved. Accordingly, the Ti content is 0.08% or more. The Ti content is preferably 0.09% or more, and more preferably 0.10% or more.

Meanwhile, in a case in which the Ti content exceeds 0.24%, it causes precipitation of coarse TiC and/or TiN and deterioration of inner surface cracking resistance. Accordingly, the Ti content is 0.24% or less. The Ti content is preferably 0.21% or less, more preferably 0.20% or less, and still more preferably 0.15% or less.

Al: 0.005 to 0.500%

Al is an element that generates AlN and that contributes to crystal grain size refining through the pinning effect in hot rolling. In a case in which the Al content is less than 0.005%, the pinning effect of crystal grains might not be obtained, resulting in formation of coarse ferrite. Accordingly, the Al content is 0.005% or more. The Al content is preferably 0.010% or more, and more preferably 0.020% or more.

Meanwhile, in a case in which the Al content exceeds 0.500%, it might cause precipitation of coarse AlN, resulting in deterioration of inner surface cracking resistance. Accordingly, the Al content is 0.500% or less. The Al content is preferably 0.200% or less, more preferably 0.100% or less, and still more preferably 0.050% or less.

Nb: 0.01 to 0.06%

Nb is an element that generates NbC and that contributes to crystal grain size refining through the pinning effect in hot rolling. In a case in which the Nb content is less than 0.01%, the pinning effect of crystal grains might not be obtained, resulting in formation of coarse ferrite. Accordingly, the Nb content is 0.01% or more. The Nb content is preferably 0.02% or more.

Meanwhile, in a case in which the Nb content exceeds 0.06%, it might cause precipitation of coarse NbC, resulting in deterioration of inner surface cracking resistance. Accordingly, the Nb content is 0.06% or less. The Nb content is preferably 0.04% or less.

N: 0.0005 to 0.0100%

N is an element that generates AlN and that contributes to crystal grain size refining through the pinning effect in hot rolling. In a case in which the N content is less than 0.0005%, the pinning effect of crystal grains might not be obtained, resulting in formation of coarse ferrite. Accordingly, the N content is 0.0005% or more. The N content is preferably 0.0010% or more, and more preferably 0.0030% or more.

Meanwhile, in a case in which the N content exceeds 0.0100%, it causes precipitation of coarse AlN, resulting in deterioration of inner surface cracking resistance. Accordingly, the N content is 0.0100% or less. The N content is preferably 0.0080% or less, and more preferably 0.0060% or less.

Cu: 0 to 1.00%

Cu is an optional element, and thus it may not be contained. In other words, the Cu content may be 0%.

Cu is an element that contributes to enhancement of the strength of steel. From the viewpoint of such an effect, the Cu content may be more than 0%, or 0.01% or more.

Meanwhile, in a case in which the Cu content is excessively increased, it might cause saturation of the effect, leading to cost increase. Accordingly, the Cu content is 1.00% or less. The Cu content is preferably 0.50% or less, and more preferably 0.30% or less.

Ni: 0 to 1.00%

Ni is an optional element, and thus it may not be contained. In other words, the Ni content may be 0%.

Ni is an element that contributes to enhancement of the strength of steel. From the viewpoint of such an effect, the Ni content may be more than 0%, or 0.01% or more.

Meanwhile, in a case in which the Ni content is excessively increased, it might cause saturation of the effect, leading to cost increase. Accordingly, the Ni content is 1.00% or less. The Ni content is preferably 0.50% or less, and more preferably 0.30% or less.

Cr: 0 to 1.00%

Cr is an optional element, and thus it may not be contained. In other words, the Cr content may be 0%.

Cr is an element that contributes to enhancement of the strength of steel. From the viewpoint of such an effect, the Cr content may be more than 0%, or 0.01% or more.

Meanwhile, in a case in which the Cr content is excessively increased, it might cause saturation of the effect, leading to cost increase. Accordingly, the Cr content is 1.00% or less. The Cr content is preferably 0.50% or less, and more preferably 0.30% or less.

Mo: 0 to 0.50%

Mo is an optional element, and thus it may not be contained. In other words, the Mo content may be 0%.

Mo is an element that contributes to enhancement of the strength of steel. From the viewpoint of such an effect, the Mo content may be more than 0%, 0.01% or more, or 0.10% or more.

Meanwhile, in a case in which the Mo content is excessively increased, it might cause saturation of the effect, leading to cost increase. Accordingly, the Mo content is 0.50% or less. The Mo content is preferably 0.40% or less.

V: 0 to 0.20%

V is an optional element, and thus it may not be contained. In other words, the V content may be 0%.

V is an element that contributes to enhancement of the strength of steel. From the viewpoint of such an effect, the V content may be more than 0%, or 0.005% or more.

Meanwhile, in a case in which the V content is excessively increased, it might cause saturation of the effect, leading to cost increase. Accordingly, the V content is 0.20% or less. The V content is preferably 0.10% or less.

W: 0 to 0.10%

W is an optional element, and thus it may not be contained. In other words, the W content may be 0%.

W is an element that contributes to enhancement of the strength of steel. From the viewpoint of such an effect, the W content may be more than 0%, or 0.005% or more.

Meanwhile, in a case in which the W content is excessively increased, it might cause saturation of the effect, leading to cost increase. Accordingly, the W content is 0.10% or less. The W content is preferably 0.05% or less.

Ca: 0 to 0.0200%

Ca is an optional element, and thus it may not be contained. In other words, the Ca content may be 0%.

Ca has effects of controlling an inclusion and further suppressing inner surface cracking resistance. From the viewpoint of such an effect, the Ca content may be more than 0%, 0.0001% or more, 0.0010% or more, or 0.0030% or more.

Meanwhile, in a case in which the Ca content is excessively increased, it might cause saturation of the effect, leading to cost increase. Accordingly, the Ca content is 0.0200% or less. The Ca content is preferably 0.0100% or less, and more preferably 0.0070% or less.

Mg: 0 to 0.0200%

Mg is an optional element, and thus it may not be contained. In other words, the Mg content may be 0%.

Mg has effects of controlling an inclusion and further suppressing inner surface cracking resistance. From the viewpoint of such an effect, the Mg content may be more than 0%, or 0.0001% or more.

Meanwhile, in a case in which the Mg content is excessively increased, it might cause saturation of the effect, leading to cost increase. Accordingly, the Mg content is 0.0200% or less. The Mg content is preferably 0.0100% or less, more preferably 0.0050% or less, and still more preferably 0.0020% or less.

Zr: 0 to 0.0200%

Zr is an optional element, and thus it may not be contained. In other words, the Zr content may be 0%.

Zr has effects of controlling an inclusion and further suppressing inner surface cracking resistance. From the viewpoint of such an effect, the Zr content may be more than 0%, or 0.0001% or more.

Meanwhile, in a case in which the Zr content is excessively increased, it might cause saturation of the effect, leading to cost increase. Accordingly, the Zr content is 0.0200% or less. The Zr content is preferably 0.0100% or less, more preferably 0.0050% or less, and still more preferably 0.0020% or less.

REM: 0 to 0.0200%

REM is an optional element, and thus it may not be contained. In other words, the REM content may be 0%.

"REM" refers to a rare earth element, i.e., at least one element selected from the group consisting of Sc, Y, La, Ce, Pr, Nd, Pm, Sm, Eu, Gd, Tb, Dy, Ho, Er, Tm, Yb, and Lu.

REM has effects of controlling an inclusion and further suppressing inner surface cracking resistance. From the viewpoint of such an effect, the REM content may be more than 0%, 0.0001% or more, or 0.0005% or more.

Meanwhile, in a case in which the REM content is excessively increased, it might cause saturation of the effect, leading to cost increase. Accordingly, the REM content is 0.0200% or less. The REM content is preferably 0.0100% or less, more preferably 0.0050% or less, and still more preferably 0.0020% or less.

Balance: Fe and Impurities

In the chemical composition of the base metal portion, the balance excluding each element described above is Fe and impurities.

The impurities refer to components which are contained in a raw material (for example, ore, scrap, or the like) or mixed into in a production step, and which are not intentionally incorporated into a steel.

Examples of the impurities include any elements other than the elements described above. Elements as the impurities may be only one kind, or may be two or more kinds.

Examples of the impurities include B, Sb, Sn, Co, As, Pb, Bi, and H.

Typically, Sb, Sn, Co, or As may be included in a content of, for example, 0.1% or less, Pb or Bi may be included in a content of, for example, 0.005% or less, B may be included in a content of, for example, 0.0003% or less, H may be included in a content of, for example, 0.0004% or less, and the contents of the other elements need not particularly be controlled as long as being in a usual range.

From the viewpoint of obtaining the above-mentioned effects of the respective elements, the chemical composition of the base metal portion may contain at least one element selected from the group consisting of: more than 0% but equal to or less than 1.00% of Cu, more than 0% but equal to or less than 1.00% of Ni, more than 0% but equal to or less than 1.00% of Cr, more than 0% but equal to or less than 0.50% of Mo, more than 0% but equal to or less than 0.20% of V, more than 0% but equal to or less than 0.10% of W, more than 0% but equal to or less than 0.0200% of Ca, more than 0% but equal to or less than 0.0200% of Mg, more than 0% but equal to or less than 0.0200% of Zr, and more than 0% but equal to or less than 0.0200% of REM.

$V_{c90}$: 200 or more

In the chemical composition of the base metal portion, $V_{c90}$, defined by the following Formula (i), represents a value as an index of the hardenability of steel.

$$\log V_{c90} = 2.94 - 0.75(\beta a - 1) \quad \text{Formula (i)}$$

$$\beta a = 2.7C + 0.4Si + Mn + 0.45Ni + 0.8Cr + Mo \quad \text{Formula (ii)}$$

wherein, in Formula (i), βa represents a value defined by Formula (ii), and in Formula (ii), element symbols represent % by mass of respective elements.

As $V_{c90}$ increases, the hardenability of steel decreases, thereby facilitating generation of ferrite.

In the electric resistance welded steel pipe of the disclosure, the areal ratio of ferrite is 80% or more.

From the viewpoint of achieving such an areal ratio of ferrite, $V_{c90}$ is 200 or more. $V_{c90}$ is preferably 220 or more, and more preferably 240 or more.

The upper limit of $V_{c90}$ is not particularly restricted. From the viewpoint of the production suitability of the electric resistance welded steel pipe, $V_{c90}$ is preferably 1500 or less.

Ti/C Ratio: 0.85 to 5.00

In the chemical composition of the base metal portion, the Ti/C ratio (i.e., the mass ratio of Ti content to C content, which means the ratio of % by mass of Ti to % by mass of C) is 0.85 or more. As a result, the strength of steel can be improved through precipitation of TiC. The Ti/C ratio is preferably 1.00 or more, and more preferably 1.10 or more.

In the chemical composition of the base metal portion, the Ti/C ratio is 5.00 or less. As a result, deterioration of inner surface cracking resistance due to precipitation of coarse TiC and/or TiN can be suppressed. The Ti/C ratio is preferably 4.00 or less, and more preferably 3.00 or less.

<Metallographic Microstructure of Base Metal Portion>

The electric resistance welded steel pipe of the disclosure has a metallographic microstructure of a central portion in a wall thickness direction of an L cross section of a base metal portion, in which the areal ratio of ferrite is 80% or more, the average crystal grain size of ferrite crystal grains is 10 μm or less, and the average aspect ratio of ferrite crystal grains is 2.0 or less.

As a result of the metallographic microstructure of the central portion in the wall thickness direction of the L cross section of the base metal portion satisfying these conditions, inner surface cracking resistance of the electric resistance welded steel pipe is improved.

Herein, "L cross section" refers to a cross section parallel to a pipe axis direction and a wall thickness direction.

Areal Ratio of Ferrite: 80% or More

In the metallographic microstructure of the central portion in the wall thickness direction of the L cross section of the base metal portion, the areal ratio of ferrite is 80% or more. As a result, forming strain caused by bending forming can be evenly distributed to crystal grains, thereby improving inner surface cracking resistance.

In a case in which the areal ratio of ferrite is less than 80%, strain is concentrated in a boundary between a hard phase (i.e., a phase consisting of structure other than ferrite) and a soft phase (i.e., a phase consisting of ferrite), it facilitates generation of inner surface cracking during bending forming (i.e., deterioration of inner surface cracking resistance).

The areal ratio of ferrite is preferably 85% or more, and more preferably 90% or more.

The areal ratio of ferrite may be 100%, or less than 100%.

The "areal ratio of ferrite" herein refers to an areal ratio of polygonal ferrite in the whole metallographic microstructure.

In a case in which the areal ratio of ferrite is less than 100%, the balance of the metallographic microstructure is preferably at least one of pearlite and bainite.

The concept of "bainite" herein includes both upper bainite in which bainitic ferrite is in the lath form and lower bainite in which bainitic ferrite is in the plate form [see, for example, "Materia Japan" issued by the Japan Institute of Metals and Materials, Vol. 46 (2007), No. 5, pp. 321-326]. In addition, the concept of "bainite" herein further includes tempered bainite that is generated during air cooling after coiling of a hot-rolled steel sheet (i.e., during air cooling in the form of a hot-coil).

The concept of "pearlite" herein includes pseudo-pearlite.

The measurement of the areal ratio of ferrite and the identification of the balance are performed in the manner described below.

An L cross section (observation face) at a base metal 180° position of the electric resistance welded steel pipe of the disclosure (i.e., a position deviating at 180° in the circumferential direction of the pipe from an electric resistance welded portion; the same applies hereinafter) is polished and then etched with a nital liquid in accordance with JIS G 0551 (2013). An optical micrograph of the metallographic microstructure of the central portion in the wall thickness direction on the etched L cross section (also hereinafter referred to as "metallographic micrograph") is taken. Metallographic micrographs corresponding to ten 1,000-times visual fields (corresponding to an actual cross-sectional area of 0.12 mm²) are taken by an optical microscope.

The measurement of the areal ratio of ferrite and the identification of the balance are conducted based on image processing results obtained by performing image processing of the metallographic micrographs that were taken. The image processing is performed using, for example, a small-sized general-purpose image analysis apparatus LUZEX AP manufactured by NIRECO CORPORATION.

FIG. 1 is a metallographic microstructure image (optical micrograph) showing an example of the metallographic microstructure of a base metal portion of the electric resistance welded steel pipe of the disclosure.

The metallographic micrograph in FIG. 1 is one (one visual field) of metallographic micrographs used in the measurement of an areal ratio of ferrite and the identification of the balance in Example 1 described later.

As set forth in FIG. 1, the metallographic microstructure of this example is a metallographic microstructure mainly consisting of polygonal ferrite.

Average crystal grain size of ferrite crystal grains: 10 μm or less

In the metallographic microstructure of the central portion in the wall thickness direction of the L cross section of the base metal portion, the average crystal grain size of ferrite crystal grains is 10 μm or less. As a result, forming strain caused by bending forming can be easily evenly distributed to ferrite crystal grains. As a result, inner surface cracking resistance can be improved.

In a case in which the average crystal grain size of ferrite crystal grains exceeds 10 forming strain caused by bending forming is concentrated on coarse ferrite crystal grains, which might induce inner surface cracking (i.e., deterioration of inner surface cracking resistance).

The average crystal grain size of ferrite crystal grains is preferably 8 μm or less.

The lower limit of the average crystal grain size of ferrite crystal grains is not particularly restricted. From the viewpoint of the production suitability of steel, the average crystal grain size of ferrite crystal grains is preferably 3 μm or more, and more preferably 4 μm or more.

The average crystal grain size of ferrite crystal grains is measured in the manner described below.

The metallographic microstructure of the central portion in the wall thickness direction of the L cross section of the base metal portion (specifically a base metal 180° position in the electric resistance welded steel pipe of the disclosure) is observed using an SEM-EBSD system (at a magnification of 1,000 times) so as to obtain the grain sizes of ferrite crystal grains, each of which is surrounded by a high angle grain boundary with a tilt angle of 15° or more. The grain sizes of the ferrite crystal grains are obtained as equivalent circle diameters.

According to this method, the grain size of every ferrite crystal grain in a view range of 200 μm (pipe axis direction)×500 μm (wall thickness direction) is obtained. The arithmetic mean of the obtained measurement values (grain sizes) is calculated, and the thus obtained arithmetic mean value is determined as the average crystal grain size of the ferrite crystal grains.

Average Aspect Ratio of Ferrite Crystal Grains: 2.0 or Less

In the metallographic microstructure of the central portion in the wall thickness direction of the L cross section of the base metal portion, the average aspect ratio of ferrite crystal grains is 2.0 or less. As a result, it is possible to suppress inner surface cracking which may continuously occur in the pipe axis direction (i.e., in the rolling direction during production of a hot-rolled steel sheet as a material for an electric resistance welded steel pipe) (i.e., to improve inner surface cracking resistance).

In a case in which the average aspect ratio of ferrite crystal grains exceeds 2.0, a continuously grain boundary of ferrite crystal grains is likely to be formed in the pipe axis direction. As a result, once cracks are formed on an inner surface of an electric resistance welded steel pipe, cracks extend in the pipe axis direction, which might result in continuous cracking (i.e., inner surface cracking).

The average aspect ratio of ferrite crystal grains is preferably 1.8 or less, and more preferably 1.6 or less.

The average aspect ratio of ferrite crystal grains is obviously 1.0 or more by its definition. The average aspect ratio of ferrite crystal grains is preferably more than 1.0, more preferably 1.1 or more, and still more preferably 1.2 or more.

The average aspect ratio of ferrite crystal grains is measured in the manner described below.

The metallographic microstructure of the central portion in the wall thickness direction of the L cross section of the base metal portion (specifically a base metal 180° position in the electric resistance welded steel pipe of the disclosure) is observed using an SEM-EBSD system (at a magnification of 1,000 times) so as to obtain the forms of ferrite crystal grains, each of which is surrounded by a high angle grain boundary with a tilt angle of 15° or more. Each of the obtained forms is processed by elliptical approximation. In the obtained ellipse, the ratio of a long axis length with respect to a short axis length (i.e., the long axis length/short axis length ratio) is determined as the aspect ratio of the ferrite crystal grain.

According to this method, the aspect ratio of every ferrite crystal grain in a view range of 200 μm (pipe axis direction)×500 μm (wall thickness direction) is obtained. The arithmetic mean of the obtained measurement values (aspect ratios) is calculated, and the thus obtained arithmetic mean value is determined as the average aspect ratio of the ferrite crystal grains.

Here, in general, the above-mentioned long axis direction is approximately identical to the pipe axis direction of the electric resistance welded steel pipe (i.e., in the rolling direction during production of a hot-rolled steel sheet as a material for an electric resistance welded steel pipe), and the above-mentioned short axis direction is approximately identical to the wall thickness direction of the electric resistance welded steel pipe.

The electric resistance welded steel pipe of the disclosure has a tensile strength in the pipe axis direction of from 750 to 1000 MPa.

As a result of the tensile strength in the pipe axis direction being 750 MPa or more, the strength of an electric resistance welded steel pipe for a torsion beam is ensured. The tensile strength in the pipe axis direction is preferably 800 MPa or more.

As a result of the tensile strength in the pipe axis direction being 1000 MPa or less, inner surface cracking resistance is improved. The tensile strength in the pipe axis direction is preferably 990 MPa or less.

The tensile strength in the pipe axis direction of the electric resistance welded steel pipe of the disclosure is measured in the manner described below.

A JIS 12 tensile test specimen is sampled at a base metal 180° position of the electric resistance welded steel pipe of the disclosure. The sampled JIS 12 tensile test specimen is examined by performing a tensile test in the pipe axis direction in accordance with JIS Z 2241 (2011), thereby measuring the tensile strength in the pipe axis direction. The obtained results are determined as the tensile strength in a pipe axis direction of the electric resistance welded steel pipe of the disclosure.

The outer diameter of the electric resistance welded steel pipe of the disclosure is not particularly restricted. From the viewpoint of the production suitability of an electric resistance welded steel pipe, the outer diameter is preferably from 50 to 150 mm.

The wall thickness of the electric resistance welded steel pipe of the disclosure is not particularly restricted. From the viewpoint of the production suitability of an electric resistance welded steel pipe, the wall thickness of the electric resistance welded steel pipe of the disclosure is preferably from 2.0 to 4.0 mm.

The electric resistance welded steel pipe of the disclosure is preferably an as-rolled electric resistance welded steel pipe.

The term "as-rolled electric resistance welded steel pipe" used herein refers to an electric resistance welded steel pipe which is not subjected to heat treatment other than seam heat treatment after pipe-making.

The term "pipe-making" refers to a process of roll-forming a hot-rolled steel sheet to thereby make an open pipe, and processing abutting portions of the obtained open pipe by electric resistance welding to form an electric resistance welded portion.

The term "roll-forming" refers to forming an open pipe by processing a hot-rolled steel sheet by bending.

It is possible to confirm whether an as-rolled electric resistance welded steel pipe is formed if yield elongation is not observed when a tensile test in the pipe axis direction is performed.

Yield elongation is not observed for an as-rolled electric resistance welded steel pipe when a tensile test in the pipe axis direction is performed.

In contrast, yield elongation is observed for an electric resistance welded steel pipe subjected to heat treatment other than seam heat treatment after pipe-making (e.g., tempering) when a tensile test in the pipe axis direction is performed.

The electric resistance welded steel pipe of the disclosure is used for producing a torsion beam.

Production of a torsion beam using the electric resistance welded steel pipe of the disclosure is carried out by, for example, processing a part of the electric resistance welded steel pipe of the disclosure by bending forming. Bending forming is performed by, for example, pushing a part of a linear area in parallel with the pipe axis direction of the electric resistance welded steel pipe of the disclosure in the outside-to-inside direction of the electric resistance welded steel pipe (e.g., see the bending test illustrated in FIG. 2 described later). As a result, for example, a torsion beam including a portion having an approximately V-shaped closed cross section (e.g., see FIG. 3 described later) is produced.

Usually, there is a tendency that inner surface cracking is likely to occur in a case in which the curvature radius R of the inner surface of a bent portion formed by bending forming is small.

However, according to the electric resistance welded steel pipe of the disclosure having excellent inner surface cracking resistance, the occurrence of inner surface cracking is effectively suppressed even in such a case.

Therefore, the effect of improving inner surface cracking resistance according to the electric resistance welded steel pipe of the disclosure is exerted effectively especially in a case in which the curvature radius R of the inner surface of a bent portion formed by bending forming is small.

In other words, the effect of improving inner surface cracking resistance according to the electric resistance welded steel pipe of the disclosure is exerted effectively especially in a case in which the electric resistance welded steel pipe of the disclosure is used for producing a torsion beam including a bent portion having a small curvature radius R of the inner surface (e.g., a bent portion having a curvature radius R of the inner surface that is not more than 2 times (preferably 0.7 to 2 times, and more preferably 1 to 2 times) the wall thickness).

<One Example of Production Method>

One example of a method of producing an electric resistance welded steel pipe of the present disclosure is the following production method A.

The production method A includes:

a slab preparation step of preparing a slab having the chemical composition in the disclosure;

a hot rolling step of heating the prepared slab to a slab heating temperature of from 1070° C. to 1300° C., and hot-rolling the heated slab under a condition of a hot-rolling finishing temperature of 920° C. or more, thereby obtaining a hot-rolled steel sheet;

a cooling step of conducting primary cooling of the hot-rolled steel sheet obtained in the hot rolling step at a primary cooling rate of from 40° C./s to 100° C./s to achieve a retention temperature of from 650° C. to 700° C., retaining the temperature at the retention temperature for 3 to 15 s (retention time), and then conducting secondary cooling at a secondary cooling rate of not less than 60° C./s to achieve a coiling temperature of 550° C. or less;

a coiling step of coiling the hot-rolled steel sheet after secondary cooling at the above-mentioned coiling temperature, thereby obtaining a hot coil configured from the hot-rolled steel sheet;

a pipe-making step of uncoiling the hot-rolled steel sheet from the hot coil, roll-forming the uncoiled hot-rolled steel sheet to thereby make an open pipe, and processing abutting portions of the obtained open pipe by electric resistance welding to form an electric resistance welded portion, thereby obtaining an electric resistance welded steel pipe; and a diameter reduction step of reducing the outer diameter of the obtained electric resistance welded steel pipe by a sizer with a diameter reduction rate of 2.0% or less for diameter reduction.

According to the production method A, the electric resistance welded steel pipe of the disclosure, in which the tensile strength in the pipe axis direction is from 750 to 1000 MPa, and in the metallographic microstructure of the central portion in the wall thickness direction of the L cross section of the base metal portion, the areal ratio of ferrite is 80% or more, the average crystal grain size of ferrite crystal grains is 10 µm or less, and the average aspect ratio of ferrite crystal grains is 2.0 or less, can be readily produced.

(Slab Preparation Step)

The slab preparation step of the production method A is a step of preparing a slab having the above-mentioned chemical composition.

The slab preparation step may be a step of producing a slab or a step of simply preparing preliminarily a produced slab.

In the case of slab production, for example, molten steel having the above-mentioned chemical composition is produced, and slab is produced using the produced molten steel. At such time, slab may be produced by a continuous casting method. Alternatively, slab may be produced by preparing an ingot using molten steel and processing the ingot by slabbing.

(Hot Rolling Step)

The hot rolling step of the production method A is a step of heating the prepared slab to a slab heating temperature of from 1070° C. to 1300° C., and hot-rolling the heated slab under a condition of a hot-rolling finishing temperature of 920° C. or more, thereby obtaining hot-rolled steel sheet.

By heating a slab to a slab heating temperature of from 1070° C. to 1300° C., it is possible to solubilize a carbide, a nitride compound, and a carbonitride compound which have precipitated in the molten steel solidification process in steel. As a result, it is possible to finely disperse a carbide in ferrite after hot rolling, thereby improving strength without deterioration of inner surface cracking resistance. It is also possible to suppress the generation of microvoids during forming.

In a case in which the slab heating temperature is 1070° C. or more, it is possible to sufficiently solubilize carbide, a nitride compound, and a carbonitride compound which have precipitated in the molten steel solidification process in steel.

In a case in which the slab heating temperature is 1300° C. or less, it is possible to prevent coarse AlN from precipitating during hot-rolling or cooling after hot-rolling.

When the hot-rolling finishing temperature is 920° C. or more, this means that hot-rolling is performed in a recrystallization region, rather than being performed in a non-recrystallization region. As a result, an electric resistance welded steel pipe to be obtained is likely to achieve an average aspect ratio of ferrite crystal grains of 2.0 or less.

(Cooling Step and Coiling Step)

The cooling step of the production method A is a step of conducting primary cooling of the hot-rolled steel sheet obtained in the hot rolling step at a primary cooling rate of from 40° C./s to 100° C./s to achieve a retention temperature of from 650° C. to 700° C., retaining the temperature at the retention temperature for 3 to 15 s (retention time), and then conducting secondary cooling at a secondary cooling rate of not less than 60° C./s to achieve a coiling temperature of from 550° C. or less.

The coiling step of the production method A is a step of coiling the hot-rolled steel sheet after secondary cooling at the above-mentioned coiling temperature, thereby obtaining a hot coil configured from the hot-rolled steel sheet.

In a case in which the primary cooling rate is from 40° C. to 100° C./s, an electric resistance welded steel pipe to be obtained is likely to achieve an average crystal grain size of ferrite crystal grains of 10 µm or less.

In a case in which the retention temperature is 650° C. or more, an electric resistance welded steel pipe to be obtained is likely to achieve an areal ratio of ferrite of 80% or more.

In a case in which the retention temperature is 700° C. or less, an electric resistance welded steel pipe to be obtained is likely to achieve an average crystal grain size of ferrite crystal grains of 10 µm or less.

In a case in which the retention time is 3 s or more, an electric resistance welded steel pipe to be obtained is likely to achieve an areal ratio of ferrite of 80% or more.

In a case in which the retention time is 15 s or less, an electric resistance welded steel pipe to be obtained is likely to achieve an average crystal grain size of ferrite crystal grains of 10 µm or less.

In a case in which the secondary cooling rate is 60° C./s or more, an electric resistance welded steel pipe to be obtained is likely to achieve an average crystal grain size of ferrite crystal grains of 10 µm or less and a tensile strength in a pipe axis direction of 750 MPa or more.

In a case in which the coiling temperature is 550° C. or less, an electric resistance welded steel pipe to be obtained is likely to achieve an average crystal grain size of ferrite crystal grains of 10 µm or less and a tensile strength in a pipe axis direction of 750 MPa or more.

(Pipe-Making Step)

The pipe-making step is a step of uncoiling the hot-rolled steel sheet from the hot coil, roll-forming the uncoiled hot-rolled steel sheet to thereby make an open pipe, and subjecting abutting portions of the obtained open pipe to electric resistance welding to form an electric resistance welded portion, thereby obtaining an electric resistance welded steel pipe.

The pipe-making step can be carried out in accordance with a known method.

(Diameter Reduction Step)

The diameter reduction step is a step of reducing the outer diameter of the obtained electric resistance welded steel pipe obtained in the pipe-making step by a sizer with a diameter reduction rate of 2.0% or less for diameter reduction.

In a case in which a diameter reduction rate is 2.0% or less, an electric resistance welded steel pipe to be obtained is likely to achieve an average aspect ratio of ferrite crystal grains of 2.0 or less.

Each of the steps of the production method A described above does not affect the chemical composition of steel.

Accordingly, the chemical composition of the base metal portion of an electric resistance welded steel pipe produced by the production method A can be considered to be identical to the chemical composition of a raw material (molten steel or slab).

The production method A may include other steps, if necessary.

The other steps may include, for example, a step of applying seam heat treatment to the electric resistance welded portion of the electric resistance welded steel pipe after the pipe-making step and before the diameter reduction step.

EXAMPLES

Examples of the present disclosure will be described below. However, the present disclosure is not limited to the following Examples.

Examples 1 to 16, and Comparative Examples 1 to 12

<Production of Electric Resistance Welded Steel Pipe>

An electric resistance welded steel pipe was obtained in each of Examples according to the above-mentioned production method A. The electric resistance welded steel pipes of Comparative Examples 1 to 12 and Examples were obtained by changing the electric resistance welded steel pipe production conditions or the chemical composition, if appropriate (see Table 2).

Details are described below.

Molten steels (steels A to W) having the chemical compositions set forth in Table 1 were produced in a furnace, and slabs each having a thickness of 250 mm were prepared by casting (the slab preparation step).

The balance excluding the elements set forth in Table 1 is Fe and impurities.

In Table 1, REM in steel H is La, and REM in steel P is Ce.

$V_{c90}$ in Table 1 is $V_{c90}$ defined by Formula (i) and Formula (ii) described above.

Ti/C in Table 1 means the mass ratio of Ti content to C content.

Each underline in Table 1 and Table 2 indicates a value that does not fall within the range of the disclosure.

Each slab obtained above was heated to the slab heating temperature set forth in Table 2, and then processed by hot-rolling under the condition of the hot-rolling finishing temperature set forth in Table 2, thereby obtaining a hot-rolled steel sheet (the hot rolling step).

Each hot-rolled steel sheet obtained in the hot rolling step was subjected to primary cooling, retention, and secondary cooling under the conditions set forth in Table 2, and then coiled at the coiling temperature set forth in Table 2, thereby obtaining a hot coil configured from a hot-rolled steel sheet having a sheet thickness of 3.0 mm (the cooling step and the coiling step).

Next, an electric resistance welded steel pipe before diameter reduction was obtained by uncoiling the hot-rolled steel sheet from the hot coil, roll-forming the uncoiled hot-rolled steel sheet to thereby make an open pipe, and subjecting abutting portions of the obtained open pipe to electric resistance welding to form an electric resistance welded portion (pipe-making step).

The outer diameter of each obtained electric resistance welded steel pipe before diameter reduction was reduced by a sizer with the diameter reduction rate set forth in Table 2, thereby obtaining an electric resistance welded steel pipe having an outer diameter of 90 mm and a wall thickness of 3.0 mm.

<Measurement of Areal Ratio of Ferrite and Confirmation of Kind of Balance>

With respect to the metallographic microstructure of the central portion in the wall thickness direction of the L cross section of the base metal portion of the obtained electric resistance welded steel pipe, the areal ratio of ferrite was measured, and the kind of the balance was confirmed, according to the method described above.

The results are set forth in Table 2.

In the kind of the balance in Table 2, "B, P" means that the balance is at least one of bainite and pearlite.

<Average Aspect Ratio of Ferrite Crystal Grains>

With respect to the metallographic microstructure of the central portion in the wall thickness direction of the L cross section of the base metal portion of the obtained electric resistance welded steel pipe, the average aspect ratio of ferrite crystal grains (simply referred to as the "average aspect ratio" in Table 2) was measured according to the method described above.

The results are set forth in Table 2.

<Average Crystal Grain Size of Ferrite Crystal Grains>

With respect to the metallographic microstructure of the central portion in the wall thickness direction of the L cross section of the base metal portion of the obtained electric resistance welded steel pipe, the average crystal grain size of ferrite crystal grains (simply referred to as "average aspect ratio" in Table 2) was measured according to the method described above.

The results are set forth in Table 2.

<Measurement of Tensile Strength in Pipe Axis Direction>

The tensile strength in a pipe axis direction of each obtained electric resistance welded steel pipe (simply referred to as "tensile strength" in Table 2) was measured by the method described above.

In each of Examples and Comparative Examples, yield elongation was not observed in the tensile test conducted in the pipe axis direction for measurement of tensile strength.

The results are set forth in Table 2.

<Bending Test (Evaluation of Inner Surface Crack Depth)>

Each obtained electric resistance welded steel pipe was examined by a bending test simulating production of a torsion beam, and the inner surface crack depth was evaluated. Details are described below.

Figure 2:
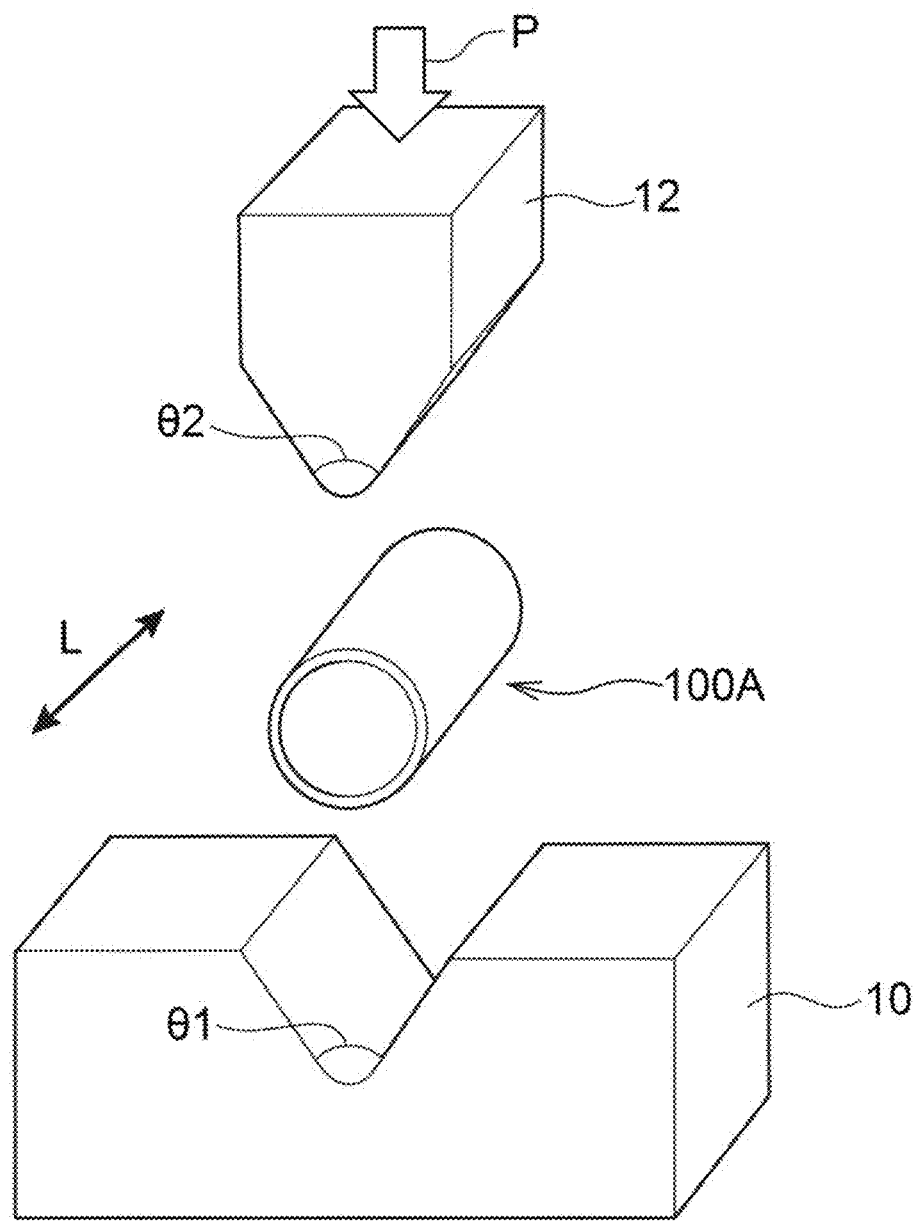
FIG. 2 is a schematic view showing the outline of the bending test in Examples.

FIG. 2 is a schematic view showing the outline of the bending test.

As set forth in FIG. 2, an electric resistance welded steel pipe 100A, which is any of the electric resistance welded steel pipes of Examples and Comparative Examples, a lower die 10 having a V-shaped notch portion, and a punch 12 having a tip having an approximately triangular cross section were prepared.

Here, both an angle θ1 of a trough of a notch portion of a die 10 and an angle θ2 of a tip of a punch 12 were set to 60°.

In this bending test, an electric resistance welded steel pipe 100A was placed in the notch portion of the lower die 10, the punch 12 was pushed into the placed electric resistance welded steel pipe 100A in the direction of arrow P, thereby conducting bending forming of the electric resistance welded steel pipe 100A. As a result, the electric resistance welded steel pipe 100A was partially bent in a direction perpendicular to the pipe axis direction L of the electric resistance welded steel pipe 100A, thereby forming a structure 100B having an approximately V-shaped closed cross section set forth in FIG. 3.

Here, the pipe axis direction L of the electric resistance welded steel pipe 100A corresponds to the rolling direction during production of a hot-rolled steel sheet used as a material for the electric resistance welded steel pipe 100A.

Figure 3:
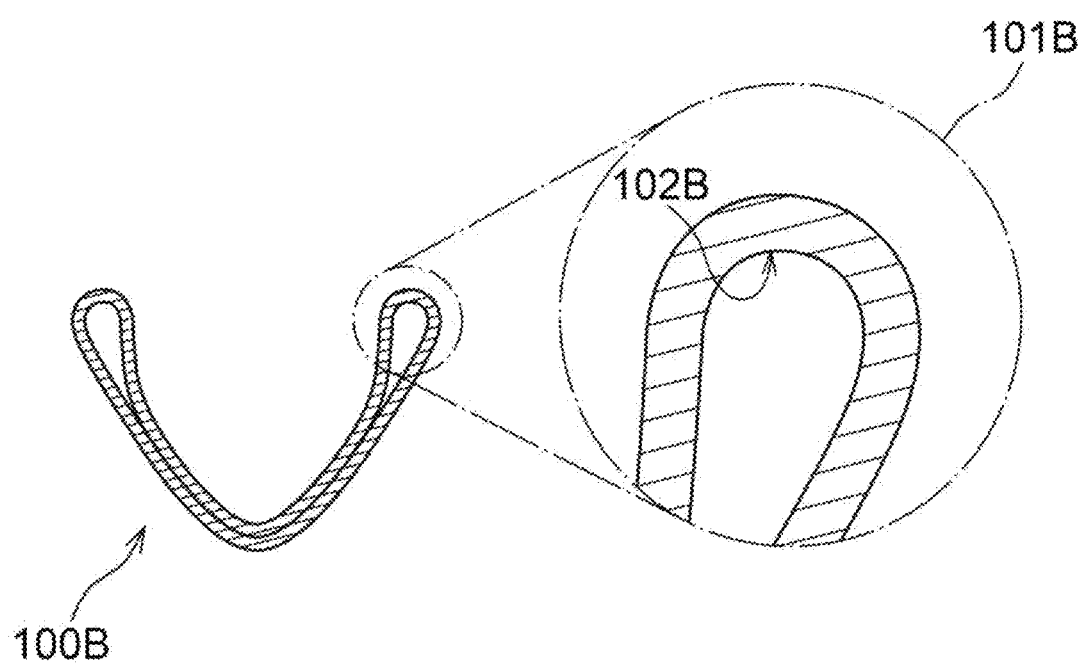
FIG. 3 is a cross-cross sectional schematic view schematically showing a cross section of a structure obtained by processing an electric resistance welded steel pipe by bending forming in the bending test in Examples.

FIG. 3 is a cross-sectional schematic view schematically showing a cross section of a structure obtained by processing an electric resistance welded steel pipe 100A by bending forming in the bending test. The cross section of the structure set forth in FIG. 3 is a cross section perpendicular to the longitudinal direction of the structure, which corresponds to a C cross section of an electric resistance welded steel pipe before bending forming (i.e., a cross section perpendicular to the pipe axis direction L).

As set forth in FIG. 3, a structure 100B having an approximately V-shaped closed cross section was formed by processing an electric resistance welded steel pipe 100A by bending forming. Here, the amount of pushing by the punch 12 was adjusted such that the curvature radius R of an inner surface 102B was set to 4 mm at one end portion 101B (bent portion) of a closed cross section of the structure 100B. The curvature radius R for the other end portion of a closed cross section of the structure 100B was also adjusted to 4 mm.

The inner surface 102B of the cross section of the one end portion 101B (specifically, a cross section corresponding to FIG. 3) and the vicinity thereof were observed by a scanning electron microscope (SEM), thereby measuring the depth of an inner surface crack (hereinafter also referred to as "inner surface crack depth").

Here, the inner surface crack depth was determined in the manner described below.

The presence or absence of an inner surface cracks was confirmed by observing the inner surface 102B of the cross section of the one end portion 101B and the vicinity thereof by SEM. In a case in which inner surface cracks were present, the linear distance between the origin and the end of a crack was determined for each inner surface crack, thereby determining the depth of each inner surface crack. The maximum value among the depths of individual inner surface cracks was designated as the "inner surface crack depth" in Examples or Comparative Examples. In a case in which no inner surface cracks were present, the "inner surface crack depth" in Examples or Comparative Examples was determined to be "0 μm".

The obtained inner surface crack depths are set forth in Table 2.

In the evaluation of the inner surface crack depth, as the inner surface crack depth decreases, the inner surface cracking resistance becomes more excellent. When the inner surface crack depth is 0 it means that no inner surface cracks are formed, indicating that remarkably excellent inner surface cracking resistance is achieved.

TABLE 1

| Steel | C | Si | Mn | P | S | Ti | Al | Nb | N | Cu | Ni | Cr |
|---|---|---|---|---|---|---|---|---|---|---|---|---|
| A | 0.05 | 1.00 | 1.20 | 0.015 | 0.004 | 0.13 | 0.024 | 0.03 | 0.0050 | | | |
| B | 0.08 | 0.25 | 0.86 | 0.017 | 0.004 | 0.10 | 0.031 | 0.03 | 0.0050 | | | |
| C | 0.07 | 0.22 | 1.57 | 0.015 | 0.004 | 0.08 | 0.025 | 0.03 | 0.0048 | | | |
| D | 0.05 | 0.20 | 0.50 | 0.010 | 0.004 | 0.09 | 0.024 | 0.03 | 0.0050 | | | |
| E | 0.06 | 0.24 | 0.81 | 0.018 | 0.003 | 0.15 | 0.028 | 0.02 | 0.0047 | | | |
| F | 0.09 | 0.27 | 0.92 | 0.010 | 0.003 | 0.20 | 0.031 | 0.02 | 0.0055 | 0.10 | | 0.08 |

TABLE 1-continued

| | | | | | | | | | | | | |
|---|---|---|---|---|---|---|---|---|---|---|---|---|
| G | 0.09 | 0.28 | 0.60 | 0.019 | 0.004 | 0.08 | 0.026 | 0.04 | 0.0040 | | | 0.12 |
| H | 0.09 | 0.27 | 0.78 | 0.014 | 0.004 | 0.08 | 0.032 | 0.04 | 0.0055 | | 0.18 | |
| I | 0.05 | 0.28 | 1.00 | 0.016 | 0.004 | 0.14 | 0.028 | 0.03 | 0.0046 | | | |
| J | 0.08 | 0.24 | 1.22 | 0.020 | 0.004 | 0.09 | 0.026 | 0.03 | 0.0047 | | 0.13 | |
| K | 0.08 | 0.25 | 0.86 | 0.017 | 0.004 | 0.24 | 0.031 | 0.03 | 0.0050 | | | |
| L | 0.04 | 0.22 | 1.55 | 0.015 | 0.004 | 0.08 | 0.025 | 0.03 | 0.0048 | | | |
| M | 0.05 | 0.20 | 0.50 | 0.010 | 0.004 | 0.24 | 0.024 | 0.03 | 0.0050 | | | |
| N | 0.09 | 0.27 | 0.92 | 0.010 | 0.003 | 0.21 | 0.031 | 0.02 | 0.0055 | 0.10 | | 0.08 |
| O | 0.09 | 0.28 | 0.60 | 0.019 | 0.004 | 0.18 | 0.026 | 0.04 | 0.0040 | | | 0.12 |
| P | 0.11 | 0.27 | 0.78 | 0.014 | 0.004 | 0.23 | 0.032 | 0.04 | 0.0055 | | 0.18 | |
| Q | 0.06 | 0.26 | 1.59 | 0.015 | 0.004 | 0.09 | 0.029 | 0.03 | 0.0050 | | | |
| R | 0.07 | 0.28 | 1.29 | 0.013 | 0.003 | 0.05 | 0.032 | 0.04 | 0.0058 | | 0.03 | |
| S | 0.17 | 0.20 | 1.30 | 0.011 | 0.004 | 0 | 0.027 | 0.03 | 0.0050 | | | |
| T | 0.07 | 0.23 | 2.60 | 0.016 | 0.004 | 0.08 | 0.032 | 0.03 | 0.0059 | | | |
| U | 0.06 | 0.21 | 0.76 | 0.020 | 0.004 | 0.03 | 0.024 | 0.02 | 0.0051 | | | |
| V | 0.20 | 0.20 | 1.61 | 0.010 | 0.004 | 0.05 | 0.020 | 0.03 | 0.0050 | | | |
| W | 0.08 | 0.07 | 1.21 | 0.009 | 0.002 | 0.06 | 0.026 | 0.03 | 0.0032 | | | |

| Steel | Mo | V | W | Ca | Mg | Zr | REM | $V_{c90}$ | Ti/C |
|---|---|---|---|---|---|---|---|---|---|
| A | | | | | | | | 245 | 2.60 |
| B | | | | | | | | 640 | 1.23 |
| C | | | | | | | | 201 | 1.08 |
| D | | | | | | | | 1425 | 1.86 |
| E | | | | | | | | 777 | 2.59 |
| F | | | | | | | | 480 | 2.15 |
| G | | | | | | | | 791 | 0.89 |
| H | 0.36 | 0.01 | | | 0.0002 | | 0.0013 | 331 | 0.96 |
| I | | | 0.01 | | | | | 564 | 2.69 |
| J | | | | 0.0050 | | 0.0004 | | 321 | 1.22 |
| K | | | | | | | | 640 | 2.95 |
| L | | | | | | | | 240 | 2.00 |
| M | | | | | | | | 1425 | 4.80 |
| N | | | | | | | | 480 | 2.29 |
| O | | | | | | | | 791 | 2.00 |
| P | 0.36 | 0.01 | | | 0.0002 | | 0.0013 | 296 | 2.09 |
| Q | 0.15 | 0.01 | | | | | | 154 | 1.47 |
| R | 0.34 | | | | | | | 171 | 0.74 |
| S | 0.30 | | | | | | | 122 | 0 |
| T | | | | | | | | 34 | 1.19 |
| U | | | | | | | | 858 | 0.43 |
| V | | | | | | | | 104 | 0.25 |
| W | | | | | | | | 401 | 0.79 |

TABLE 2

| | | | | Electric resistance welded steel pipe production conditions | | | | | | | | | Electric resistance welded steel pipe | | | | | | |
|---|---|---|---|---|---|---|---|---|---|---|---|---|---|---|---|---|---|---|---|
| | | | | Production condition for hot coil consisting of hot-rolled steel sheet | | | | | | | | | | | | | | | |
| | | | | Slab heating temperature (°C) | Hot-rolling finishing temperature (°C) | Primary cooling rate (°C/s) | Retention temperature (°C) | Retention time (s) | Secondary cooling rate (°C/s) | Coiling temperature (°C) | Diameter reduction rate (%) | Areal ratio of ferrite (%) | Balance | | Average aspect ratio | Average crystal grain size (μm) | Tensile strength (MPa) | Inner surface crack depth (μm) |
| | Steel | $V_{e90}$ | Ti/C | | | | | | | | | | | Kind | Areal ratio (%) | | | | |
| Example 1 | A | 245 | 2.60 | 1200 | 940 | 50 | 660 | 5 | 80 | 500 | 1.5 | 95 | B, P | 5 | 1.2 | 5 | 870 | 0 |
| Example 2 | B | 640 | 1.23 | 1200 | 940 | 50 | 680 | 5 | 80 | 500 | 1.5 | 95 | B, P | 5 | 1.2 | 5 | 820 | 0 |
| Example 3 | C | 201 | 1.08 | 1200 | 940 | 50 | 660 | 5 | 80 | 500 | 1.5 | 95 | B, P | 5 | 1.2 | 5 | 860 | 0 |
| Example 4 | D | 1425 | 1.86 | 1200 | 940 | 50 | 700 | 10 | 80 | 500 | 1.5 | 100 | — | — | 1.2 | 7 | 800 | 0 |
| Example 5 | E | 777 | 2.59 | 1200 | 940 | 50 | 690 | 5 | 80 | 500 | 1.5 | 95 | B, P | 5 | 1.2 | 5 | 860 | 0 |
| Example 6 | F | 480 | 2.15 | 1200 | 940 | 50 | 670 | 10 | 80 | 500 | 1.5 | 95 | B, P | 5 | 1.2 | 7 | 860 | 0 |
| Example 7 | G | 791 | 0.89 | 1200 | 940 | 50 | 690 | 5 | 80 | 500 | 1.5 | 95 | B, P | 5 | 1.2 | 5 | 900 | 0 |
| Example 8 | H | 331 | 0.96 | 1200 | 940 | 50 | 670 | 10 | 80 | 500 | 1.5 | 95 | B, P | 5 | 1.2 | 7 | 820 | 0 |
| Example 9 | I | 564 | 2.69 | 1200 | 940 | 50 | 680 | 5 | 80 | 500 | 1.5 | 95 | B, P | 5 | 1.2 | 5 | 860 | 0 |
| Example 10 | J | 321 | 1.22 | 1200 | 940 | 50 | 660 | 5 | 80 | 500 | 1.5 | 95 | B, P | 5 | 1.2 | 5 | 860 | 0 |
| Example 11 | K | 640 | 2.95 | 1200 | 940 | 50 | 680 | 5 | 80 | 500 | 1.5 | 95 | B, P | 5 | 1.2 | 7 | 870 | 0 |
| Example 12 | L | 240 | 2.00 | 1200 | 930 | 50 | 660 | 5 | 80 | 500 | 1.5 | 95 | B, P | 5 | 2.0 | 5 | 910 | 0 |
| Example 13 | M | 1425 | 4.80 | 1200 | 940 | 40 | 700 | 10 | 80 | 500 | 1.5 | 100 | — | — | 1.6 | 10 | 800 | 0 |
| Example 14 | N | 480 | 2.29 | 1200 | 940 | 100 | 670 | 10 | 80 | 500 | 1.5 | 80 | B, P | 20 | 1.2 | 7 | 870 | 0 |
| Example 15 | O | 791 | 2.00 | 1200 | 940 | 85 | 690 | 5 | 80 | 500 | 1.5 | 85 | B, P | 15 | 1.2 | 5 | 990 | 0 |
| Example 16 | P | 296 | 2.09 | 1200 | 940 | 70 | 680 | 5 | 80 | 500 | 1.0 | 90 | B, P | 10 | 1.2 | 5 | 980 | 0 |
| Comparative Example 1 | Q | 154 | 1.47 | 1200 | 940 | 50 | 660 | 5 | 80 | 500 | 1.5 | 70 | B, P | 30 | 1.2 | 5 | 950 | 20 |
| Comparative Example 2 | R | 171 | 0.74 | 1200 | 940 | 50 | 670 | 5 | 80 | 500 | 1.5 | 75 | B, P | 25 | 1.2 | 5 | 940 | 10 |
| Comparative Example 3 | S | 122 | 0 | 1200 | 940 | 50 | 660 | 10 | 80 | 500 | 1.5 | 60 | B, P | 40 | 1.2 | 16 | 1040 | 70 |
| Comparative Example 4 | T | 34 | 1.19 | 1200 | 940 | 50 | 660 | 5 | 80 | 500 | 1.5 | 10 | B, P | 90 | 1.2 | 5 | 1060 | 50 |
| Comparative Example 5 | U | 858 | 0.43 | 1200 | 940 | 50 | 690 | 5 | 80 | 500 | 1.5 | 95 | B, P | 5 | 1.2 | 11 | 730 | 5 |
| Comparative Example 6 | V | 104 | 0.25 | 1200 | 940 | 50 | 660 | 5 | 80 | 500 | 1.5 | 50 | B, P | 50 | 1.2 | 5 | 1100 | 60 |
| Comparative Example 7 | A | 245 | 2.60 | 1200 | 940 | 50 | 680 | 5 | 68 | 517 | 1.5 | 100 | — | — | 1.2 | 15 | 850 | 20 |
| Comparative Example 8 | A | 245 | 2.60 | 1200 | 920 | 50 | 720 | 5 | 74 | 511 | 1.5 | 100 | — | — | 2.0 | 11 | 840 | 5 |
| Comparative Example 9 | A | 245 | 2.60 | 1200 | 880 | 50 | 680 | 5 | 65 | 600 | 1.5 | 100 | — | — | 3.5 | 11 | 800 | 30 |
| Comparative Example 10 | A | 245 | 2.60 | 1200 | 880 | 50 | 660 | 0 | 80 | 537 | 1.5 | 20 | B, P | 80 | 3.5 | 5 | 920 | 50 |
| Comparative Example 11 | A | 245 | 2.60 | 1200 | 880 | 50 | 680 | 5 | 80 | 537 | 2.5 | 95 | B, P | 5 | 3.5 | 5 | 900 | 25 |
| Comparative Example 12 | W | 401 | 0.79 | 1200 | 940 | 50 | 660 | 5 | 80 | 500 | 1.5 | 95 | B, P | 5 | 1.2 | 5 | 730 | 0 |

As set forth in Table 2, the electric resistance welded steel pipes of Examples 1 to 16 each corresponding to the electric resistance welded steel pipe of the disclosure exhibited excellent tensile strength without experiencing inner surface cracking, indicating achievement of both excellent tensile strength and excellent inner surface cracking resistance.

On the other hand, in Comparative Examples 1 to 4 and 6 in which $V_{c90}$ was less than 200 (i.e., excessively high hardenability of steel), the areal ratio of ferrite was less than 80%, indicating deterioration of inner surface cracking resistance.

In addition, in Comparative Examples 5 and 12 in which $V_{c90}$ was 200 or more while Ti/C was less than 0.85, tensile strength decreased.

Further, in Comparative Examples 7 to 9 in which the average crystal grain size of ferrite crystal grains was more than 10 μm while the chemical composition in the disclosure was applied, inner surface cracking resistance deteriorated.

Furthermore, in Comparative Examples 9 to 11 in which the average aspect ratio of ferrite crystal grains was more than 2.0 while the chemical composition in the disclosure was applied, inner surface cracking resistance deteriorated.

The entire disclosure of Japanese Patent Application No. 2016-195680 is incorporated herein by reference.

All documents, patent applications, and technical standards described in this specification are herein incorporated by reference to the same extent as if each individual document, patent application, or technical standard was specifically and individually indicated to be incorporated by reference.

The invention claimed is:

1. An electric resistance welded steel pipe for a torsion beam, the steel pipe comprising a base metal portion and an electric resistance welded portion,
wherein a chemical composition of the base metal portion comprises, in terms of % by mass:
0.04 to 0.12% of C,
0.03 to 1.20% of Si,
0.30 to 2.50% of Mn,
0 to 0.030% of P,
0 to 0.010% of S,
0.08 to 0.24% of Ti,
0.005 to 0.500% of Al,
0.01 to 0.06% of Nb,
0.0005 to 0.0100% of N,
0 to 1.00% of Cu,
0 to 1.00% of Ni,
0 to 1.00% of Cr,
0 to 0.50% of Mo,
0 to 0.20% of V,
0 to 0.10% of W,
0 to 0.0200% of Ca,
0 to 0.0200% of Mg,
0 to 0.0200% of Zr,
0 to 0.0200% of REM, and,
a balance comprising Fe and impurities, wherein:
$V_{c90}$, defined by the following Formula (i), is 200 or more,
a mass ratio of Ti content to C content is from 0.85 to 5.00,
an areal ratio of ferrite is 80% or more, an average crystal grain size of ferrite crystal grains is 10 μm or less, and an average aspect ratio of ferrite crystal grains is 2.0 or less, in a metallographic microstructure of a central portion in a wall thickness direction of an L cross section of the base metal portion, and
a tensile strength in a pipe axis direction is from 750 to 1000 MPa;

$$\log V_{c90} = 2.94 - 0.75(\beta a - 1) \quad \text{Formula (i)}$$

$$\beta a = 2.7C + 0.4Si + Mn + 0.45Ni + 0.8Cr + Mo \quad \text{Formula (ii)}$$

wherein, in Formula (i), βa represents a value defined by Formula (ii), and in Formula (ii), element symbols represent % by mass of respective elements.

2. The electric resistance welded steel pipe for a torsion beam according to claim 1,
wherein the chemical composition of the base metal portion contains, in terms of % by mass, at least one selected from the group consisting of:
more than 0% but equal to or less than 1.00% of Cu,
more than 0% but equal to or less than 1.00% of Ni,
more than 0% but equal to or less than 1.00% of Cr,
more than 0% but equal to or less than 0.50% of Mo,
more than 0% but equal to or less than 0.20% of V,
more than 0% but equal to or less than 0.10% of W,
more than 0% but equal to or less than 0.0200% of Ca,
more than 0% but equal to or less than 0.0200% of Mg,
more than 0% but equal to or less than 0.0200% of Zr, and
more than 0% but equal to or less than 0.0200% of REM.

3. The electric resistance welded steel pipe for a torsion beam according to claim 1, which has an outer diameter of from 50 to 150 mm and a wall thickness of from 2.0 to 4.0 mm.

4. The electric resistance welded steel pipe for a torsion beam according to claim 2, which has an outer diameter of from 50 to 150 mm and a wall thickness of from 2.0 to 4.0 mm.

5. An electric resistance welded steel pipe for a torsion beam, the steel pipe comprising a base metal portion and an electric resistance welded portion,
wherein a chemical composition of the base metal portion consists of, in terms of % by mass:
0.04 to 0.12% of C,
0.03 to 1.20% of Si,
0.30 to 2.50% of Mn,
0 to 0.030% of P,
0 to 0.010% of S,
0.08 to 0.24% of Ti,
0.005 to 0.500% of Al,
0.01 to 0.06% of Nb,
0.0005 to 0.0100% of N,
0 to 1.00% of Cu,
0 to 1.00% of Ni,
0 to 1.00% of Cr,
0 to 0.50% of Mo,
0 to 0.20% of V,
0 to 0.10% of W,
0 to 0.0200% of Ca,
0 to 0.0200% of Mg,
0 to 0.0200% of Zr,
0 to 0.0200% of REM, and,
a balance consisting of Fe and impurities, wherein:
$V_{c90}$, defined by the following Formula (i), is 200 or more,
a mass ratio of Ti content to C content is from 0.85 to 5.00,
an areal ratio of ferrite is 80% or more, an average crystal grain size of ferrite crystal grains is 10 μm or less, and an average aspect ratio of ferrite crystal grains is 2.0 or less, in a metallographic microstructure of a central portion in a wall thickness direction of an L cross section of the base metal portion, and a tensile strength in a pipe axis direction is from 750 to 1000 MPa;

$$\log V_{c90} = 2.94 - 0.75(\beta a - 1) \quad \text{Formula (i)}$$

$$\beta a = 2.7C + 0.4Si + Mn + 0.45Ni + 0.8Cr + Mo \quad \text{Formula (ii)}$$

wherein, in Formula (i), Pa represents a value defined by Formula (ii), and in Formula (ii), element symbols represent % by mass of respective elements.

6. The electric resistance welded steel pipe for a torsion beam according to claim 5,
wherein the chemical composition of the base metal portion contains, in terms of % by mass, at least one selected from the group consisting of:
more than 0% but equal to or less than 1.00% of Cu,
more than 0% but equal to or less than 1.00% of Ni,
more than 0% but equal to or less than 1.00% of Cr,
more than 0% but equal to or less than 0.50% of Mo,
more than 0% but equal to or less than 0.20% of V,
more than 0% but equal to or less than 0.10% of W,
more than 0% but equal to or less than 0.0200% of Ca,
more than 0% but equal to or less than 0.0200% of Mg,
more than 0% but equal to or less than 0.0200% of Zr, and
more than 0% but equal to or less than 0.0200% of REM.

7. The electric resistance welded steel pipe for a torsion beam according to claim 5, which has an outer diameter of from 50 to 150 mm and a wall thickness of from 2.0 to 4.0 mm.

8. The electric resistance welded steel pipe for a torsion beam according to claim 6, which has an outer diameter of from 50 to 150 mm and a wall thickness of from 2.0 to 4.0 mm.

\* \* \* \* \*